June 24, 1958  W. G. WING  2,840,366
ACCELEROMETERS
Filed Nov. 25, 1952  2 Sheets-Sheet 2
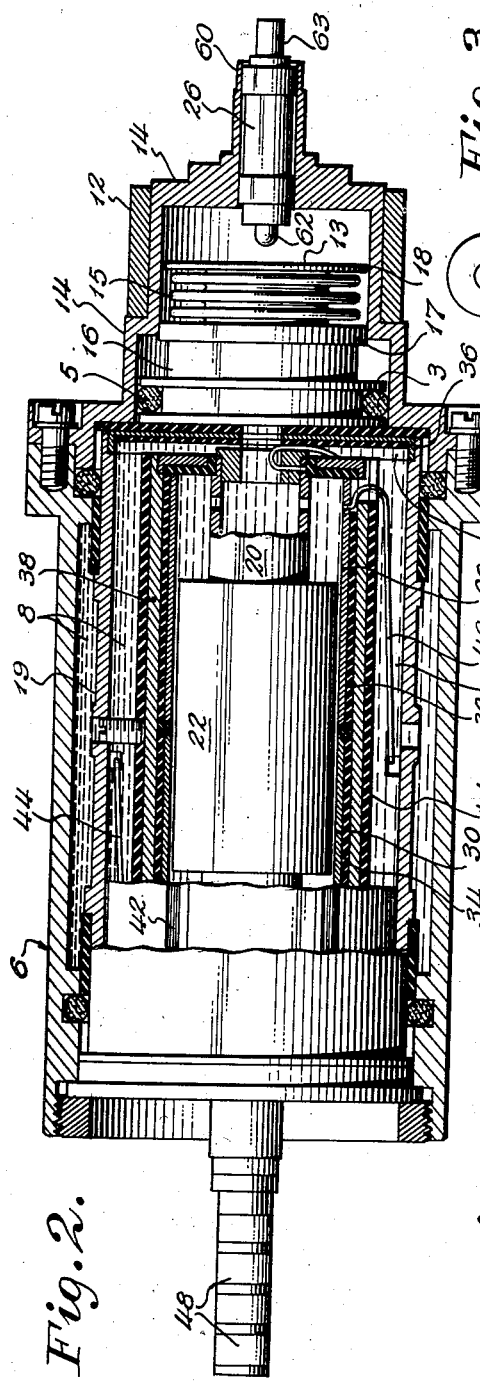
Fig. 2.
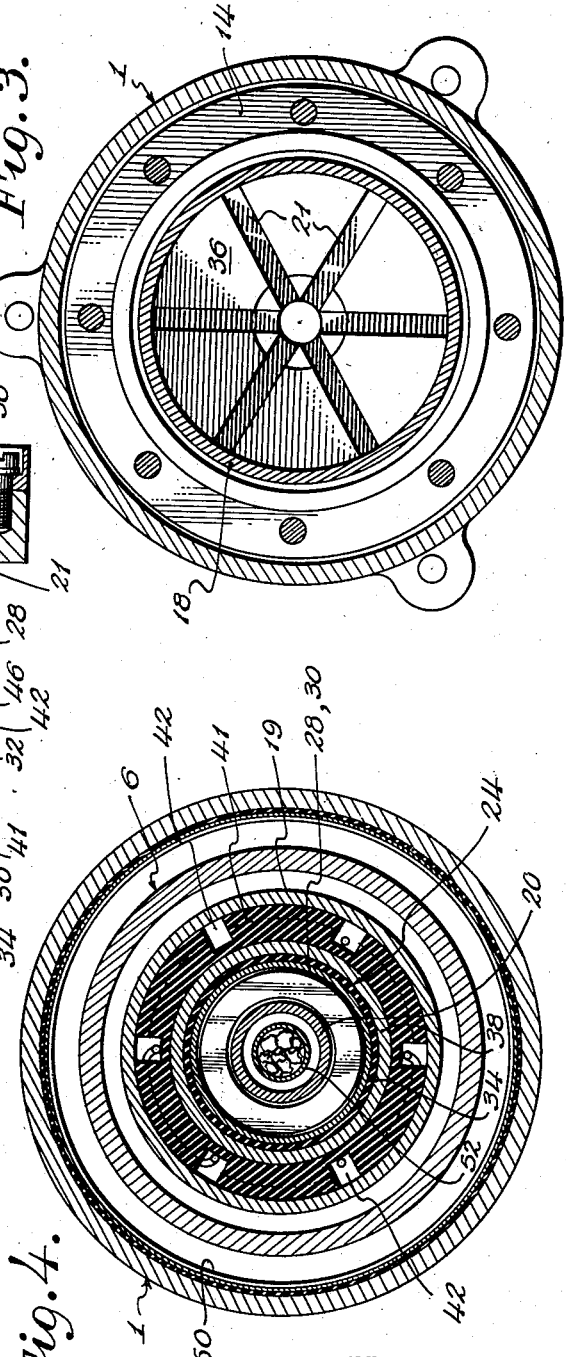
Fig. 3.
Fig. 4.
INVENTOR
WILLIS G. WING
BY
Herbert H. Thompson
his ATTORNEY.

United States Patent Office 2,840,366
Patented June 24, 1958

2,840,366

ACCELEROMETERS

Willis G. Wing, Roslyn Heights, N. Y., assignor to Sperry Rand Corporation, a corporation of Delaware Application November 25, 1952, Serial No. 322,403

10 Claims. (Cl. 264—1)

This invention relates to accelerometers, which term is usually employed to describe an instrument which is responsive to accelerations along a selected line or about a selected axis and which measures the magnitude of the acceleration. Recent techniques have improved such instruments to such an extent that their use has been proposed not only for measuring the amount of linear acceleration but, by integrating the output of the instrument, for showing either the instantaneous or terminal velocity of the vehicle on which the instrument is mounted. As a further refinement, it has been proposed to show by double integration, the distance covered by the vehicle, or in other words, the change of position of the vehicle over the earth's surface, but for either of these two special uses, an accuracy and sensitivity is required far in excess of the usual accelerometer. The present invention relates to improvements in the construction of such highly accurate accelerometers whereby the accuracy of the same is further improved and the pick-off means simplified and improved to detect minute changes in position of the acceleration responsive element.

The particular type of accelerometer to which my improvement relates is essentially an integrating accelerometer and consists of a float immersed in a viscous liquid for movement in a straight line so that the float is subject only to acceleration forces acting along such line. Although the float or mass has a lesser specific gravity than the liquid, means are provided so that the float in operation does not touch the wall of the container for the liquid, but remains centralized near the central axis of the container. To obtain this result, the container and liquid are rapidly revolved about the longitudinal center axis of the float, so that the mass remains centralized and hence slightly and equally spaced from the wall of the container at all points.

By mounting the accelerometer on a level platform, it will behave so that upon acceleration, the total translation of the float through the viscous liquid will be in direct proportion to change of velocity of the vehicle upon which it is mounted, if no centralizing force is employed, and hence, I provide electrical pick-off means for measuring and indicating the displacement of the float, as a speedometer which is independent of wind or water currents. Such movement is, of course, affected by the viscosity of the liquid, and since viscosity changes with temperature, I provide an accurate means for maintaining the temperature of the liquid constant. One of my improvements consists of an improved means for controlling the thermostat which governs the constant temperature means.

The position of the float is also obviously affected by any random or circulatory currents within the liquid container, such as due to thermal convection and the like. To minimize this effect, I use a float in the form of an annulus or hollow cylinder, so that if the liquid is moving or circulating from any cause between the two ends of the container (such as where one end of the container runs hotter than the other), the drag of the circulating liquid on the inner wall of the cylinder, for instance, will be balanced and cancelled out by the drag of the return flow of the liquid on the outer wall.

A further improvement is that I have provided a means for overcoming the disturbing effect of any air bubbles trapped in the liquid.

Further improvements and objects will appear from the following specification and claims.

Referring to the drawings in which a preferred form of the invention is shown:

Fig. 2 is a similar sectional view of the rotating shell and its contained parts, in which portions of the concentric sleeves contained within the shell are shown in elevation, including the float itself;

Fig. 3 is a vertical section taken approximately on line 3—3 of Fig. 1;

Fig. 4 is a vertical section taken approximately on line 4—4 of Fig. 1; and

Fig. 5 is an elementary wiring diagram showing the pick-off and indicating means operated therefrom.

Figure 1:
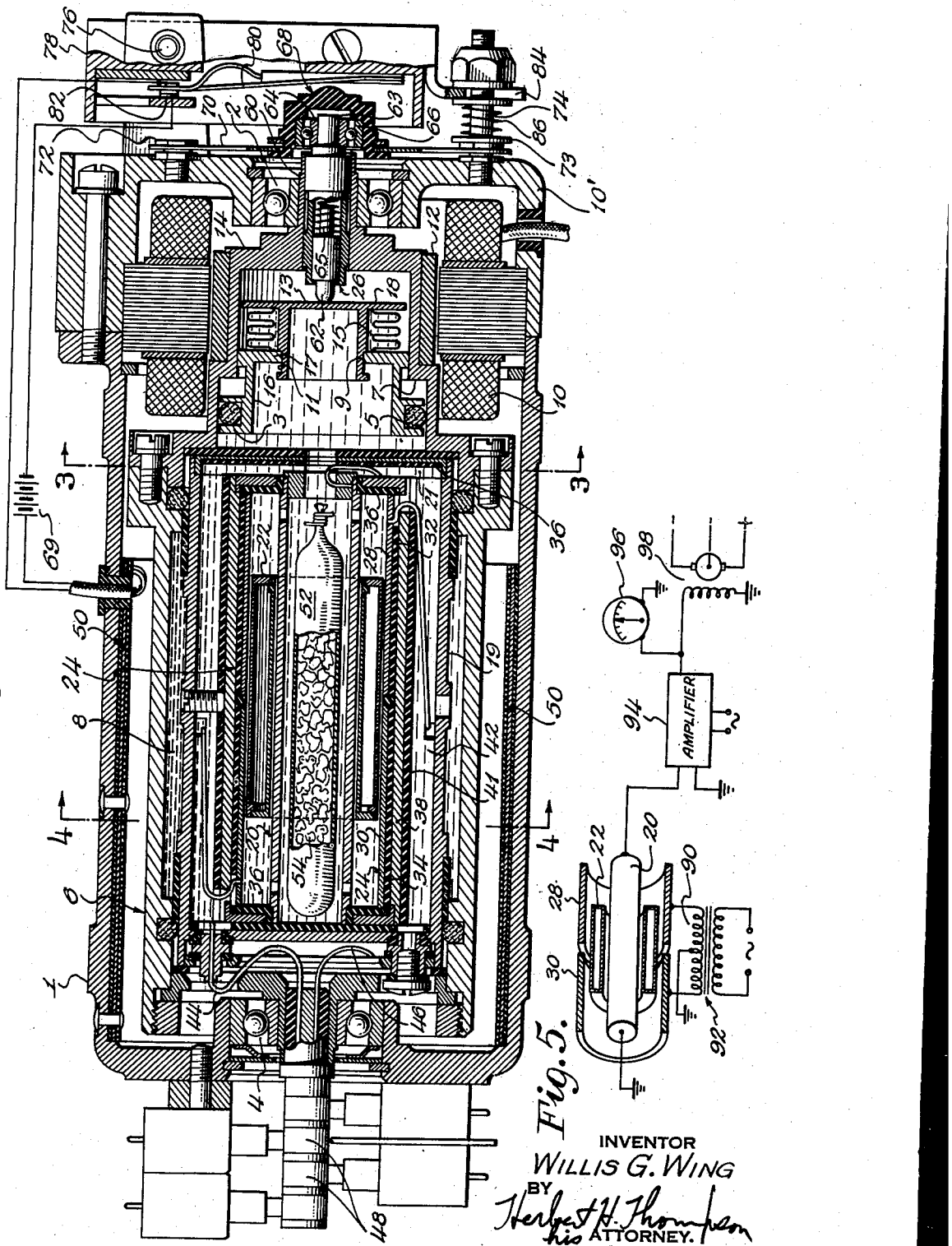
Fig. 1 is a vertical section on a somewhat enlarged scale of an accelerometer constructed in accordance with my invention.

My accelerometer is shown as comprising an outer hollow cylindrical casing 1, which may be attached in any suitable manner to the vehicle on which the instrument is used. Most of the metallic portions of my accelerometer are preferably made of aluminum or magnesium to reduce weight. In the casing is rotatably mounted on anti-friction bearings 2 and 4 a cylindrical shell 6 adapted to contain a liquid 8 of suitable viscous properties such as silicone type fluid. The shell is normally revolved in its bearings by suitable motor 10 fixed to one end of the casing 1, the armature or rotor 12 of which is secured to a cap piece 14 forming a closure for that end of the cylindrical shell 6. Within the rotor or cap is mounted a slidably mounted small piston preferably formed of two interfitting hollow cups 16 and 18, the open sides of which are in communication with the liquid 8 within the container.

By this arrangement, I not only provide a means for allowing for the expansion and contraction of the liquid within the casing and shell but also make use of this arrangement for thermostatically controlling a switch for maintaining constant the temperature of the liquid and thereby maintaining the proper viscosity. The larger cup 16 is guided at its inner end by circular flanges 3 between which is compressed a liquid seal packing 5 forming a slidable seal between the cup and the inner wall of the cap. Outward movement of cup 16 is prevented by engagement of one flange 3 with the shoulder 7 formed by the reduction in the size of the inner end of the cap 14. The outer end 17 of the cup 16 is flanged and guided in the reduced end of the cap. The cup 16 is also provided with a central opening 9 in its end wall within which is slidably mounted the smaller cup 18, the movement of the latter being limited by the walls of the annular channel 11 formed around the inner end thereof. Cup 18 has an enlarged base or bottom 13, and a flexible bellows 15 is provided between the base 13 and the end of the cup 16, so as to prevent the escape of liquid. When the liquid is cold, the two cups are in the position shown in Fig. 2, but as the liquid expands, the inner cup 16 moves to the right as shown in Fig. 1 followed by a similar movement of the cup 18, until the base 13 engages the plunger 26 which operates a thermostatic switch as hereinafter described.

Within the revolving shell 6, I mount a plurality of interfitting cylinders or sleeves. The longitudinal axis of the innermost cylinder or tube 20 and the hollow cylindrical float are substantially coaxial when the device is spinning about the coaxial axis of spin in the bearings 2 and 4.

By employing a hollow cylindrical type float, I avoid errors which would otherwise be caused by variations in fluid temperature between the two ends of the float. Because of the presence of the drive motor at one end, there are certain to be small temperature gradients and it can be shown that, without this provision, a temperature difference of the order of .001° F. can be objectionable. If there is a fluid temperature difference between the ends of the float, then there will also be a difference in the fluid densities. As a result of the spinning of the assembly, a pressure is produced within the fluid which varies as the square of the radius. The pressure variation with radius will be greater at the end having the higher density and hence the lower temperature. By employing a hollow float, circulation of the fluid is allowed to occur as a result of the pressure differential. This flow will be outward at the cool end, along the outer surface of the float, inward at the warm end and back through the center of the float. With a given float there is a predetermined relation between the clearance between the inner wall of the float 22 and the tube 20 and that between the outer surface of the float and the inner surface of the cylinder 24, such as to cause the summation of all axial fluid forces on the float to be zero. The nominal dimensions of the parts are so chosen as to achieve this result.

The cylinder or sleeve 24 is made up of a number of layers or sections. The innermost section comprises two short cylinders or rings 28 and 30, which act as condenser plates and are insulated from the rest of the device by insulating sleeves 32, 34 and end insulating discs 36, which also insulate the tube 20 from the other condenser rings 28 and 30. The next sleeve 38 constitutes the wall of the main fluid chamber and is surrounded by a thick sleeve 41 of insulation having longitudinal slots 42 for the reception of the lead in wires.

A metal shell 19 encloses the composite condenser structure in which the inner short sleeves 28 and 30 act as condenser plates in cooperation with the central tube 20, the float 22 acting to vary the capacitive reactance between the respective plates 28 and 30 and the tube 20, such capacitive reactance being the same when the float is exactly centralized, and varying in relative magnitude in one direction or the other, when the float is moved in one direction or the other from its central position. Lead in wires 44 and 46 are shown passing through channels 42 to slip ring 48 for leading the E. M. F. into and from the condenser plates. The composite cylinder 24 is again mounted within but insulated from the outer shell 6, the entire revolving unit being shown in Fig. 2. Use of these alternate revolving layers of conductive and insulating materials very effectively reduces thermal gradients inside the chamber in which the float moves.

The temperature of the entire device including its contained liquid is kept constant, preferably at a temperature well above the ambient temperature. For this purpose, I have shown a heating coil secured to the interior of the outer casing 1 and preferably made in the form of a flexible pad 50 in which fine wires are embedded. The voltage supplied to the pad is varied by thermostatic means controlled by the temperature of the liquid, as hereinafter described.

To obtain accurate control, I place within the liquid a small container 52 containing an organic crystalline substance 54 known in the trade as "coumarin," which has a melting point somewhat above the ambient temperature, and which possesses the property of marked expansion when it melts. By immersing a bag or tube of this substance entirely in the liquid, it will be seen that the expansion of the coumarin in melting adds to the normal expansion of the fluid with temperature and hence, at the temperature at which the coumarin melts, the volume of the liquid will be markedly changed. The essentially invariable melting point of the coumarin thus produces a fixed temperature reference. By putting a movable end wall such as cap 16 controlled by this expansion and contraction of the liquid, I may operate by the movement of this cap a switch 80 controlling the current supplied to the heating coil.

For this purpose, I have shown a plunger 26 slidably mounted within the hollow shaft 60 of the cap piece 14. The plunger is provided with a reduced outer end 63 to which is secured the inner race 64 of a ball bearing, the outer race 66 being mounted within an insulating button or cap 68. This cap is resiliently biased to the left in Fig. 1, so as to hold the plunger inwardly. For this purpose, I have shown a leaf spring 70 attached at either end to the motor framework 10' by retainers 72 and 73 and pressing on cap 68. I also pivotally mount at 76 a housing 78 for a spring contact arm 80, which is normally biased in a closed position against the fixed contact 82. The lower end of said housing is shown as having a slotted foot 84 loosely guided by the bolt 74 and is spring pressed outwardly by means of a coil spring 86 around the bolt. It will, therefore, be seen that as the liquid expands, the outer wall 13 of cap 18 will move outwardly until it contacts nose 62 connected to the plunger 26, whereupon the plunger will move outwardly to cause engagement between the cap 68 and the spring arm 80 to open the switch and cut off the current supplied to the heating element from source 69. Thereupon the device will cool down until the plunger moves enough to the left to permit the switch to close to repeat the cycle. The nose 62 is shown as slidably mounted within the hollow plunger 26 to allow extra expansion after the switch is opened, and the plunger has moved to the end of the stroke. To this end, the nose is pressed outwardly by compression spring 65, which is stiff enough to cause the plunger to move with the nose until the plunger strikes the outer stop (not shown). Since marked expansion of the volume of the liquid takes place at the melting point of the coumarin, close regulation of the temperature may be secured even though the switch operates as an off-on switch, as shown.

One important superiority of my device over prior art devices consists in providing a space along the axis of the instrument, which is out of contact with the float. One of the chief causes of error in this type of instrument is the presence of air bubbles in the liquid, and while this trouble may be largely avoided by evacuating the instrument and by degassing the liquid before the liquid is put in, nevertheless, some small air bubbles are bound to remain. In my device, the air bubbles collect along the spin axis of the device and, therefore, never contact the ring float to affect the viscous drag but are entirely within the inner tube 20.

In the elementary diagram of Fig. 5, I have shown the condenser plates or rings 28, 30, as supplied with oppositely phased alternating current, as by being connected to opposite ends of the secondary 90 of the transformer 92. In this diagram, the slip rings shown in Figs. 1 and 2 are omitted for sake of simplicity. No net charge will hence be induced on the common secondary plate or tube 20 when the float 22 is exactly in the middle. Upon movement of the float, however, the capacitive reactance between plates 28 and 20 as compared between 30 and 20 will be altered, resulting in an induced E. M. F., which may be led off and amplified, and if desired, rectified in a phase sensitive amplifier 94, and the output used to actuate a speedometer 96 or a servomotor 98 to drive or assist in controlling a gyro-stabilized platform (not shown) on which the accelerometer may be mounted. The sensitivity of this type of pick-off matches the sensitivity of the accelerometer itself since by it, displacements on the order of much less than a thousandth of an inch may be detected and amplified into furnishing useful signals in actuating a torque applying device or servomotor. Furthermore, this type of pick-off exerts a minimum amount of force on the float, since electromagnetic forces are not involved.

By my invention, I have been able to secure an integrating accelerometer or speedometer which is accurate within very few seconds of tilt, and thus excels all prior accelerometers and has sufficient accuracy to be used in a system for determining position on the earth's surface by comparison between the local vertical, as indicated by a Schuler pendulum (a gyro vertical having approximately an 84 minute period) and a space reference indicated by observation of the stars. For such purposes two of my accelerometers would be mounted horizontally in the east-west and north-south planes preferably on a gyro vertical having a period of about 84 minutes. When so employed, my accelerometers could be used to advantage to assist in maintaining the gyro in the vertical by operating through an integrating means such as very slow servomotors or for controlling the application of torques to the gyro in addition to or preferably instead of torques normally controlled by the gravitational or pendulous factor of the gyroscope.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An integrating accelerometer comprising an outer container, a shell or cylinder rotatably mounted within said container and adapted to contain a liquid, a smaller cylinder mounted within said shell and adapted to be rotated therewith, an annular float of less length than said cylinders and mounted between said cylinders with predetermined interior and exterior clearances, means for spinning said shell with its contained parts and pick-off means responsive to relative longitudinal displacement of said float and said cylinders for producing a velocity signal proportional to such displacement.

2. An integrating accelerometer as claimed in claim 1 having a heating coil for maintaining said liquid at a predetermined elevated temperature and a thermostatic switch controlled by thermal expansion and contraction of said liquid for controlling the supply of current to such coil.

3. An integrating accelerometer as claimed in claim 1, in which said pick-off includes a pair of symmetrically placed cylindrical capacitors on the surface of one of said cylinders adjacent said float, said other cylinder adjacent said float constituting a common complementary capacitor, means for supplying high frequency potentials of opposite phase to said capacitors whereby the intermediate float varies the capacitive reactance between such cylinders upon longitudinal displacement of said float, and means responsive to the output of said capacitors for indicating velocity.

4. In an integrating accelerometer, an outer container, a shell rotatably mounted within said container and adapted to contain a liquid, a heating element within said shell for maintaining the temperature of the liquid at a predetermined elevation, a substance within such liquid characterized by having a melting point at about the desired elevated temperature of the liquid and marked expansion upon melting, and an expansible member within such shell having a part moved by changes in the volume of the liquid and a switch controlled thereby for governing the current flow to said heating coils.

5. An integrating accelerometer comprising an outer container, a shell rotatably mounted within said container and adapted to contain a liquid, means for spinning said shell about an axis, whereby air bubbles if present, will collect near said axis, and an annular float within said liquid and of less length than said shell, whereby the air bubbles do not contact the surface of the float during operation, and means for detecting the direction and amount of axial displacement of said float.

6. An accelerometer as claimed in claim 5 having a tube concentrically located along said axis and extending loosely through said float, whereby said bubbles collect within said tube out of contact with said float.

7. An integrating accelerometer as claimed in claim 6 in which said detecting means comprises employing the inner surface of said shell and the outer surface of said tube as condensers, said float acting to vary the reactive impedance thereof.

8. An integrating accelerometer comprising an outer container, a shell rotatably mounted within said container and adapted to contain a liquid, an electrical heating element having a heating coil within said shell for maintaining the temperature of the liquid at a predetermined elevation when supplied with current, a small portion of coumarin immersed in said liquid which melts at the desired elevated temperature, and an expansible member within such shell having a part moved by changes in the volume of the liquid and a switch controlled thereby for governing the current supplied to said heating coils during operation.

9. As a means for maintaining a predetermined elevated temperature of liquid in a closed container, comprising a portion of coumarin immersed in the liquid, an expansible wall in said container surbject to displacement upon expansion of the liquid, an electric controller actuated thereby, and an electric heater for the liquid controlled by said controller.

10. An integrating accelerometer as claimed in claim 1 in which the clearances between inner and outer circumferential walls of the float and their adjacent cylinders are such as to avoid disturbance of the float by currents in the liquid due to differences in temperature therein.

References Cited in the file of this patent

UNITED STATES PATENTS 2,591,921   Cosgriff et al. _____ April 8, 1952